Patented Oct. 2, 1923.

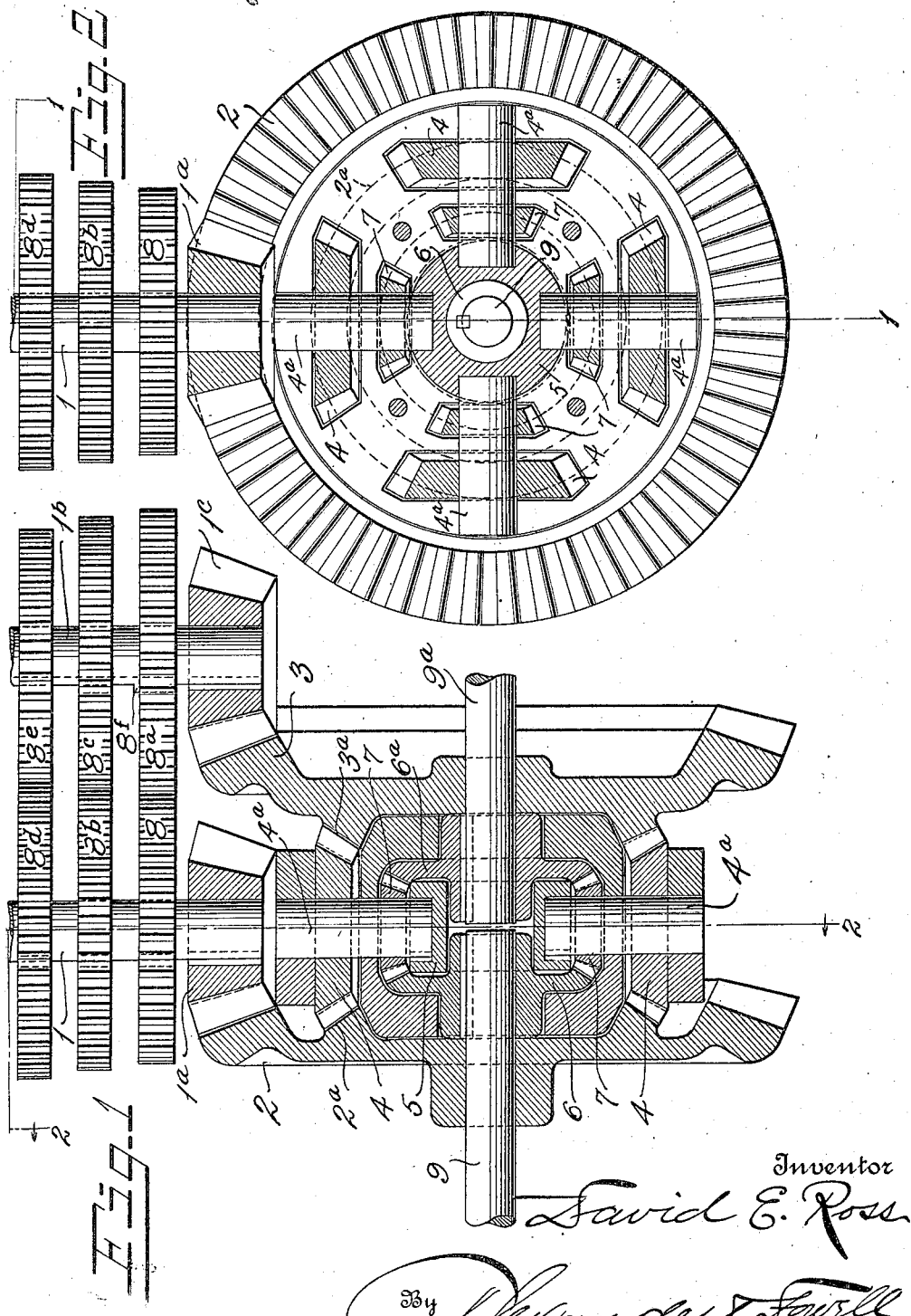

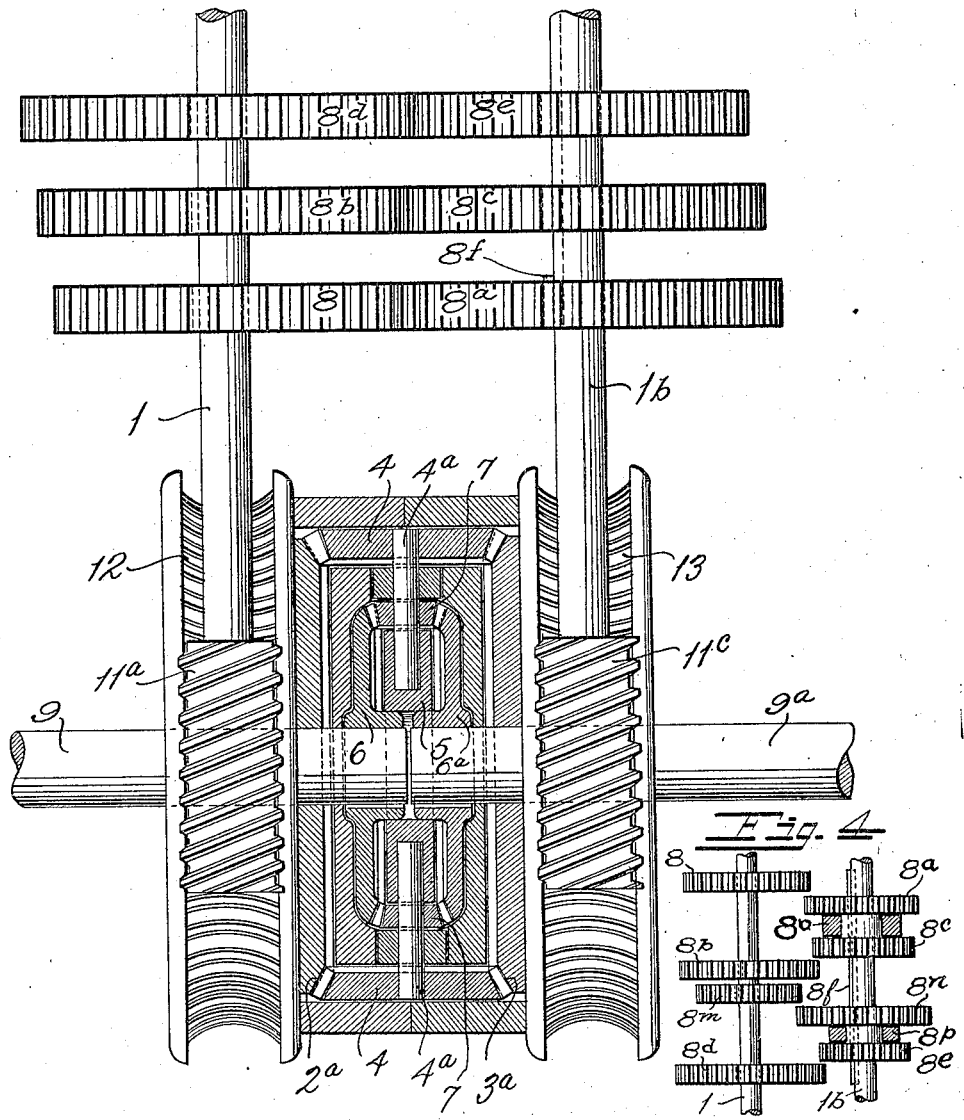

1,469,333

UNITED STATES PATENT OFFICE.

DAVID E. ROSS, OF LA FAYETTE, INDIANA.

VARIABLE-SPEED-TRANSMISSION GEARING.

Application filed April 3, 1920. Serial No. 370,907.

*To all whom it may concern:*

Be it known that I, DAVID E. Ross, a citizen of the United States, residing at La Fayette, in the county of Tippecanoe and State of Indiana, have invented certain new and useful Improvements in Variable-Speed-Transmission Gearing; and I hereby declare that the following is a full, clear, and exact description thereof, reference being had to the accompanying drawings, which form part of this specification.

This invention is a novel improvement in gearing for transmitting motion or power from a driving member to a driven member or members; and its objects are to provide an always positively geared driving connection between the driving and the driven members; and to enable the speed of the driven member, relative to the driving member to be shifted to obtain different speeds; and to enable the driven member to be reversed. The invention enables any desired reduction in speed to be made in transmission between the driving and driven members; and thereby increase the torque transmitted in proportion to the reduction in the speed.

A further object is to enable the driven member to be driven either forward or reversely by simply varying the speed of two intermediate transmitting elements.

I will explain the invention with reference to the accompanying drawings which illustrate practical embodiments thereof to enable others skilled in the art to adapt and use the same; and the essentials of the invention and novel features of construction and novel combinations of parts for all of which protection is desired are set forth in the various claims appended hereto.

In said drawings:

Fig. 1 represents a longitudinal sectional view through one form of transmission gearing embodying the invention, the section to be taken on line 1—1, Fig. 2.

Fig. 2 is a transverse sectional view of such gearing on line 2—2, Fig. 1.

Fig. 3 is in part a diagrammatic top plan view and in part a longitudinal sectional view of a variation of the form of transmission gearing.

Fig. 4 is a conventional view of a selective form of gearing.

In the drawings, 1 designates the primary driving member, which may be the shaft of the engine, or a shaft driven from any suitable prime mover. This shaft carries a bevel pinion $1^a$, which meshes with a bevel gear 2, that is rotatably journaled in or on any suitable support, and in the example shown, loosely surrounds a shaft, or axle member 9.

Parallel with and beside gear 1 is a shaft $1^b$ carrying a gear $1^c$, which meshes with a bevel gear 3, which may be journaled in or on any suitable support in axial alinement with gear 2, and is shown as loosely mounted on a shaft or axle member $9^a$, in axial alinement with shaft 9, these shafts abutting intermediate the gears 2 and 3.

Both gears 2 and 3 face in the same direction and shaft $1^b$ is geared to shaft 1 in such manner that it rotates oppositely thereto; consequently the gear 3 rotates oppositely to the gear 2.

On the inner opposed faces of gears 2 and 3 are rigidly attached or formed similar but opposed bevel gears $2^a$, $3^a$ with which mesh a series of planetary gears 4, which are journaled on stub shafts $4^a$ mounted in a suitable driven member 5, which may be mounted in any suitable manner between the gears 2 and 3.

As shown the driven member 5 is journaled upon the hubs of smaller opposed bevel gears 6, $6^a$, which are smaller in diameter than the gears $2^a$, $3^a$ but in axial alinement therewith, the gear 6 being keyed to the shaft 9 and the gear $6^a$ being keyed to the shaft $9^a$. These gears 6, $6^a$ mesh with intermediate planetary gears 7, which are shown as rotatably journaled on the shafts $4^a$ of the planetary gears 4; but the gears 4 and 7 are not fastened together and can rotate independently. The gears 6, $6^a$ and 7 constitute a compensating gear of the usual type between the shafts 9, $9^a$.

In the example shown the pinions $1^a$, $1^c$ may be alike in size; so may the gears 2 and 3; so may the gears $2^a$, $3^a$. In such case if the shafts $1^b$ were rotated at the same speed then the gears $2^a$, $3^a$ would rotate at the same speed in opposite directions and the planetary gears 4 simply rotate on their axes without any orbital movement; but by varying the relative speeds of shafts 1, $1^b$ the relative speed of movement of the gears $2^a$, $3^a$ might be changed so that one will rotate faster than the other, and in that case the planetary gears 4 will take up orbital movement in the direction of travel of the faster moving gear $2^a$ or $3^a$. The relative speed of the driving shaft 1 and driven member 5 (or shaft sections 9, 9ª) can also be varied by changing the ratios of the opposed gears 2 and 3; or 2ª and 3ª; or both; so that one gear 2ª or 3ª will rotate faster than the other, or the teeth of one of said gears will move faster than the teeth of the opposite gear; which will cause the planetary gears to take up an orbital movement in the direction of the fastest moving gear 2ª or 3ª.

Any desirable type of variable changeable speed gearing may be employed to transmit motion from shaft 1 to shaft 1ᵇ, such gear being merely conventionally illustrated in the drawing. In Fig. 1, I have indicated conventionally three sets of inter-meshing gears (8, 8ª; 8ᵇ, 8ᶜ; 8ᵈ, 8ᵉ) between the shafts 1 and 1ᵇ. The gears 8ª, 8ᶜ, are shown as loose on the shaft 1ᵇ, and the gears 8, 8ᵇ, 8ᵈ as fast on shaft 1, and respectively meshing with gears 8ª, 8ᶜ, 8ᵉ. Any one of the gears 8ª, 8ᶜ, 8ᵉ may be locked to the shaft 1ᵇ by any suitable clutch means; a movable clutch or spline member 8ᶠ being conventionally shown in the drawings.

The gear 8 is slightly smaller than the gear 8ª; the gears 8ᵇ, 8ᶜ are the same size; and the gear 8ᵈ is slightly larger than the gear 8ᵉ. If gears 8ᶜ, 8ᵉ are disengaged from shaft 1ᵇ and gear 8ª locked thereto, then shaft 1ᵇ will rotate more slowly than shaft 1, and consequently gear 2ª will rotate faster than gear 3ª, and the planetary gears 4 will take up orbital movement with the gear 2 and turn the driven member 5 and shafts 9, 9ª in the same direction as, but at much slower speed than, the gear 2.

If gears 8ª, 8ᵉ are disengaged from shaft 1ᵇ and gear 8ᶜ locked thereto; then (assuming the various opposed gears are of the same size) the gears 2ª, 3ª will rotate in opposite directions at the same speed and the planetary gears 4 will simply spin on their axes and the driven member 5 and shafts 9, 9ª will stand still.

If gears 8ª, 8ᶜ are disengaged from shaft 1ᵇ, and the gear 8ᵉ locked thereto, then shaft 1ᵇ will be driven more rapidly than shaft 1, and consequently the planetary gears will take up orbital movement in the direction of the rotation of the gear 3ª and the driven member 5 and shafts 9, 9ª will rotate in the reverse direction.

Of course by increasing the number of change gears between the shafts 1 and 1ᵇ a larger number of various speeds either forward or reverse, or both, can be transmitted from the driving to the driven members by properly shifting the controlling member. In each instance however it will be observed that the power is transmitted from the driving part to the driven part through and by positive engagement of gears.

In the form illustrated in Fig. 3, the shaft 1 carries a worm 11ª, which meshes with a worm gear 12 which carries the gear 2ª. Shaft 1ᵇ carries a worm 11ᶜ which meshes with a worm gear 13, which carries the bevel gear 3ª. The worms 11ª, 11ᶜ in Fig. 3, take the place of the pinions 1ª, 1ᶜ in Fig. 1; and the worm gears 12 and 13 in Fig. 3 take the place of the gears 2 and 3 in Fig. 1. The remaining parts in Fig. 3 are like the remaining parts in Fig. 1, and are correspondingly lettered; and the parts in Fig. 3 correspond in operation with the parts in Fig. 1, as above described.

The work gear drive, Fig. 3, is particularly useful where great reduction in speed and great augmentation of torque is desired, as for example in motor trucks for heavy duty.

It will be seen that in the constructions shown each planetary transmission gear 4 and its related compensating planetary gear 7 are mounted upon the same hardened stub shaft or pin 4ª. This construction is very simple and efficient.

The arrangement of gearing shown in Figs. 1 to 3 between shafts 1 and 1ᵇ is progressive. If desired a selective or variable form of gearing might be used between such shafts. For example, as indicated in Fig. 4, the gears 8, 8ᵇ, 8ᵈ may be attached to the shaft 1, and a smaller gear 8ᵐ attached to said shaft intermediate the gears 8ᵇ and 8ᵈ. The gears 8ª and 8ᶜ may be connected to a common hub and adjusted by a gear-shifting lever 8ᵒ of any suitable construction, so that either gear 8ª or 8ᶜ may be meshed with its related gear 8 or 8ᵇ, or both may be disengaged.

A gear 8ⁿ adapted to mesh with gear 8ᵐ is connected with the hub of gear 8ᵉ and the gears 8ᵉ, 8ⁿ can be adjusted by a gear shifting lever 8ᵖ, of any suitable construction, so that either gear 8ᵉ or 8ᵇ may be meshed with its related gear 8ᵈ or 8ᵐ, or both may be disengaged. Obviously any desired or preferred form of variable or selective gearing can be employed between the shafts 1 and 1ᵇ to vary the relative speeds thereof and the direction of rotation of the shafts 9, 9ª.

What I claim is:

1. A transmission gearing of the character specified comprising a pair of driving gears; a pair of alined shafts or axle members; a pair of opposed gears connected with the said driving gears; the gears in at least one of the pairs of gears having a definite fixed ratio other than 1:1; a driven member connected with said shafts; and a planetary gear connected with the driven member and engaging said opposed gears; with a primary driving shaft directly and positively geared to one of the driving gears; and a secondary driving shaft directly and positively geared to the other driving gear; and change gearing between said driving shafts whereby the relative speeds of rotation of said shafts may be varied.

2. A transmission gearing of the character specified comprising two worm gears; a pair of alined shafts or axle members; a pair of opposed gears connected with the said worm gears; a driven member connected with said shafts; and planetary gears connected with the driven member and engaging said opposed gears; with a primary driving shaft directly and positively geared to one worm gear; and a secondary driving shaft directly and positively geared to the other worm gear; and change gearing between said driving shafts whereby the relative speeds of rotation of said worm gears may be varied.

3. A transmission gearing of the character specified comprising a pair of driving gears; a driven member; a pair of opposed gears connected with the said driving gears; the gears in at least one of the pairs of gears having a definite fixed ratio other than 1:1; and a planetary gear connected with the driven member and meshing with the opposed gears; a pair of opposed axially alined shaft sections; and a compensating gear between said shaft sections connected with the driven member; with a primary driving shaft directly and positively geared to one of the driving gears; and a secondary driving shaft directly and positively geared to the other driving gear; and change gearing between said driving shafts; whereby the relative speeds of rotation of said driving shafts may be varied.

4. A transmission gearing of the character specified comprising a pair of driving gears; a driven member; a pair of opposed gears connected with the said driving gears; the gears in at least one of the pairs of gears having a definite fixed gear ratio other than 1:1; and a planetary gear connected with the driven member and meshing with the opposed gears; with a primary driving shaft directly and positively geared to one of the driving gears; a secondary driving shaft directly and positively geared to the other driving gear; and changeable speed gearing between the said primary and secondary driving shafts whereby the relative speeds of rotation of said shafts and of the driving gears operated thereby may be varied.

5. A transmission gearing of the character specified comprising two driven gears; a pair of alined shafts or axle members; opposed gears connected with the said driven gears; a driven member connected with said shafts; and a planetary gear connected with the driven member and engaging said opposed gears; with a primary driving shaft directly and positively geared to one of the driving gears; a secondary driving shaft directly and positively geared to the other driving gear; and positive changeable speed gearing between the said primary and secondary driving shafts whereby the relative speeds of rotation of said shafts and of the driving gears operated thereby may be varied.

6. A transmission gearing of the character specified comprising a pair of worm gears; a pair of alined shafts or axle members; a pair of opposed gears connected with the said worm gears; the gears in at least one of the pairs of gears having a definite fixed gear ratio other than 1:1; a driven member connected with said shafts; and planetary gears connected with the driven member and engaging said opposed gears; with a primary driving shaft, a worm thereon directly and positively engaging one of the worm gears; a secondary driving shaft, a worm thereon and positively engaging directly the other worm gear; and changeable speed gearing between the said primary and secondary driving shafts, whereby the relative speeds of rotation of said shafts and of the driving gears operated thereby may be varied.

7. A transmission gearing of the character specified comprising two driving gears; a driven member; opposed bevel gears connected with the said driving gears; the gears in at least one of the pairs of gears having a definite gear ratio other than 1:1; and a planetary gear connected with the driven member and meshing with the opposed bevel gears; a pair of opposed axially alined shaft sections; and a compensating gear between said shaft sections connected with the driven member; with a primary driving shaft directly and positively geared to one of the driving gears; a secondary driving shaft directly and positively geared to the other driving gear; and changeable speed gearing between the said primary and secondary driving shafts whereby the relative speeds of rotation of said shafts and of the driving gears operated thereby may be varied.

8. A transmission gearing of the character specified comprising a pair of worm gears; a driven member; a pair of opposed gears connected with the said worm gears; the gears in at least one of the pairs of gears having a definite gear ratio other than 1:1; a planetary gear connected with the driven member and meshing with said opposed gears; a pair of opposed axially alined shaft sections; and a compensating gear between said shaft sections connected with the driven member; with a primary driving shaft, a worm thereon engaging one of the worm gears; a secondary driving shaft, a worm thereon engaging the other worm gear; and changeable speed positive gearing between the said primary and secondary driving shafts whereby the relative speeds of rotation of said shafts and of the worm gears operated thereby may be varied.

9. A transmission gearing of the character specified comprising a pair of driving gears; a pair of alined shafts; a pair of opposed gears on adjacent ends of said shafts connected with the said driving gears; the gears in at least one of the pairs of gears having a definite fixed gear ratio other than 1:1; a compensating gearing connected with the shaft intermediate the driving gears; a driven member mounted on the hubs of the compensating gear on the shaft; planetary gears on said driven member engaging said opposed gears, the planetary gears and the planetary pinions of the compensating gearing being mounted upon the same radially disposed stub shafts; with means for driving the driving gears, substantially as described.

10. In gearing of the character specified, alined shaft sections, small bevel gears on the inner ends of said sections, planetary pinions between said small bevel gears; driving gears on said shafts; opposed gears connected with the said driving gears, planetary gears connected and engaging said opposed gears; a driven member mounted upon the hubs of the small bevel gears and radially disposed stub shafts mounted in said driven member upon which stub shafts both the planetary gears and the planetary pinions are mounted; with a primary driving shaft directly geared to one driving gear; and a secondary driving shaft directly geared to the other driving gear; and means whereby the relative speeds of rotation of said driving gears may be varied.

11. In gearing of the character described, opposite alined shaft sections; opposed small bevel gears respectively fastened to the adjacent ends of said sections; driving gears loosely mounted on the adjacent ends of said sections; opposed large bevel gears connected with said driving gears; planetary gears meshing with said larger bevel gears; planetary pinions meshing with the smaller bevel gears; a driven member mounted upon the hubs of the small bevel gears; and radially disposed stub shafts mounted on said driven member upon which stub shafts the axially alined planetary gears and the planetary pinions are mounted; with a primary driving shaft directly geared to one driving gear; and a secondary driving shaft directly geared to the other driving gear; and means whereby the relative speeds of rotation of said driving gears may be varied.

In testimony that I claim the foregoing as my own, I affix my signature.

DAVID E. ROSS.